US006440349B1

(12) United States Patent
Johnson

(10) Patent No.: US 6,440,349 B1
(45) Date of Patent: Aug. 27, 2002

(54) PROCESS AND APPARATUS FOR CANDLE-MAKING

(76) Inventor: Wallace E. Johnson, Wejco Inst., 9112 Spring Br. Dr., Houston, TX (US) 77080

( * ) Notice: Subject to any disclaimer, the term of this patent is extended or adjusted under 35 U.S.C. 154(b) by 0 days.

(21) Appl. No.: 09/523,773

(22) Filed: Mar. 11, 2000

(51) Int. Cl.[7] ......................... B29C 45/40; B29C 45/56; C11C 5/02

(52) U.S. Cl. ............... 264/325; 264/328.7; 264/328.16; 264/334; 425/555; 425/556; 425/442

(58) Field of Search ......................... 264/328.16, 328.7, 264/334, 328.1, 299, 325, 326, 327; 425/555, 556, 564, 565, 566, 803, 442; 249/66.1

(56) References Cited

U.S. PATENT DOCUMENTS 2,057,540 A * 10/1936 Schmitt ...................... 425/122
3,016,574 A * 1/1962 Fischer et al. ........... 264/328.7
3,164,860 A * 1/1965 Oxel ....................... 264/328.7
3,632,729 A * 1/1972 Bielfeldt ..................... 264/294
3,702,495 A * 11/1972 Renoe ........................ 264/102
4,077,110 A * 3/1978 Reiher ........................ 264/115
4,274,823 A * 6/1981 Stanciu et al. ......... 264/328.19
4,289,191 A * 9/1981 Myllymaki ................. 164/230
4,396,133 A * 8/1983 Glaser ........................ 222/334
5,205,969 A * 4/1993 Nett et al. ............. 264/328.14

FOREIGN PATENT DOCUMENTS

JP 56-151539 * 11/1981 ............. 264/328.7

* cited by examiner

*Primary Examiner*—Jill L. Heitbrink
(74) *Attorney, Agent, or Firm*—John R Casperson

(57) ABSTRACT

To form a candle blank, a volume of hot liquid candle wax is injected into a generally cylindrical chamber having a length and a diameter. The hot liquid candle wax is then cooled and the length of the generally cylindrical chamber is reduced as the wax cools, so that the volume of the chamber remains substantially that of the volume of the shrinking wax. By operating in this manner, there is no room for a void to form. An apparatus to carry out the process comprises a block, a piston, a gate, a means to inject the wax, and a means to move the piston so that it follows the shrinkage of the wax as it solidifies. The block defines a generally cylindrical mold chamber for the candle blank. The mold chamber has a generally vertically positioned longitudinal axis, an upper end, and a lower end. The piston is positioned in the chamber to slide from the upper end to the lower end of the chamber. The gate is positioned at a lower end of the chamber. The gate is pivotally mounted to the block so as to move from a first position which seals the lower end of the chamber to a second position in which the gate does not impede the ejection of the candle blank from the chamber.

30 Claims, 2 Drawing Sheets

PROCESS AND APPARATUS FOR CANDLE-MAKING

BACKGROUND OF THE INVENTION

In one aspect, this invention relates to candle-making. In another aspect, this invention relates to an apparatus for making candles.

Decorative candles have developed into a very large business in the United States. These candles vary over a wide range in size. For example, heights can range from about ½ inch to about 12 inches, and diameters can range from about ¼ inch to 8 inches. The candles are generally made of wax derived from petroleum and are often colored and scented.

Petroleum wax shrinks a great deal when it solidifies. The shrinkage affects the shape of larger candles more than smaller ones. The shrinkage has made it difficult to make acceptably appearing candles of over about an inch in diameter in an automated, single pass process, and manual techniques have to be used. While candles having a diameter of three inches and upward have a sufficiently high retail price to recover their high cost of production, it has been extremely difficult to profitably produce candles having a diameter in the range of 1–3 inches. This is unfortunate, as candles having a diameter of about two inches are very popular with consumers.

An automated process for candle production would be very desirable, especially an automated process which is well suited for the production of candles having a diameter in the range of one to three inches.

OBJECTS OF THE INVENTION

It is an object of this invention to provide a method for making candles in which the effect of shrinkage on candle appearance is minimized.

It is a further object of this invention to provide an apparatus for making candles in which the production of large diameter candles is largely automated.

SUMMARY OF THE INVENTION

In commonly encountered temperature ranges, candle wax exists in states of matter ranging from runny liquid to thick liquid to soft solid to hard solid. Under relatively mild pressure conditions, the wax can be caused to flow when in the soft solid state. The inventive concept is to apply pressure during this stage of hardening during the candle making process to cause the wax to completely fill the mold cavity, thereby largely avoiding shape imperfections in the finished candle blank.

As applied to a process for making a candle blank, the invention can be carried out by first injecting a volume of hot liquid candle wax into a generally cylindrical chamber having a length and a diameter. The hot liquid candle wax is then cooled, to at least a semi-solid state. The wax shrinks as it cools, The length of the generally cylindrical chamber is reduced as the wax cools, so that the volume of the chamber remains substantially that of the volume of the shrinking wax. By operating in this manner, there is no room for a void to form.

An apparatus which embodies the inventive concept comprises a block, a piston, a gate, a means to inject the wax, and a means to move the piston so that it follows the shrinkage of the wax as it solidifies. The block defines a generally cylindrical mold chamber for the candle blank. The mold chamber has a generally vertically positioned longitudinal axis, an upper end, and a lower end. The piston is positioned in the chamber to slide from the upper end to the lower end of the chamber. The gate is positioned at a lower end of the chamber. The gate is pivotally mounted to the block so as to move from a first position which seals the lower end of the chamber to a second position in which the gate does not impede the ejection of the candle blank from the chamber. The apparatus further comprises a means for injecting hot liquid wax into the chamber between the gate and the piston and a means for biasing the piston toward the gate to reduce chamber volume as the hot liquid wax cools. This prevents the production of a candle blank having a substantial void.

DETAILED DESCRIPTION OF THE INVENTION

Figure 1:
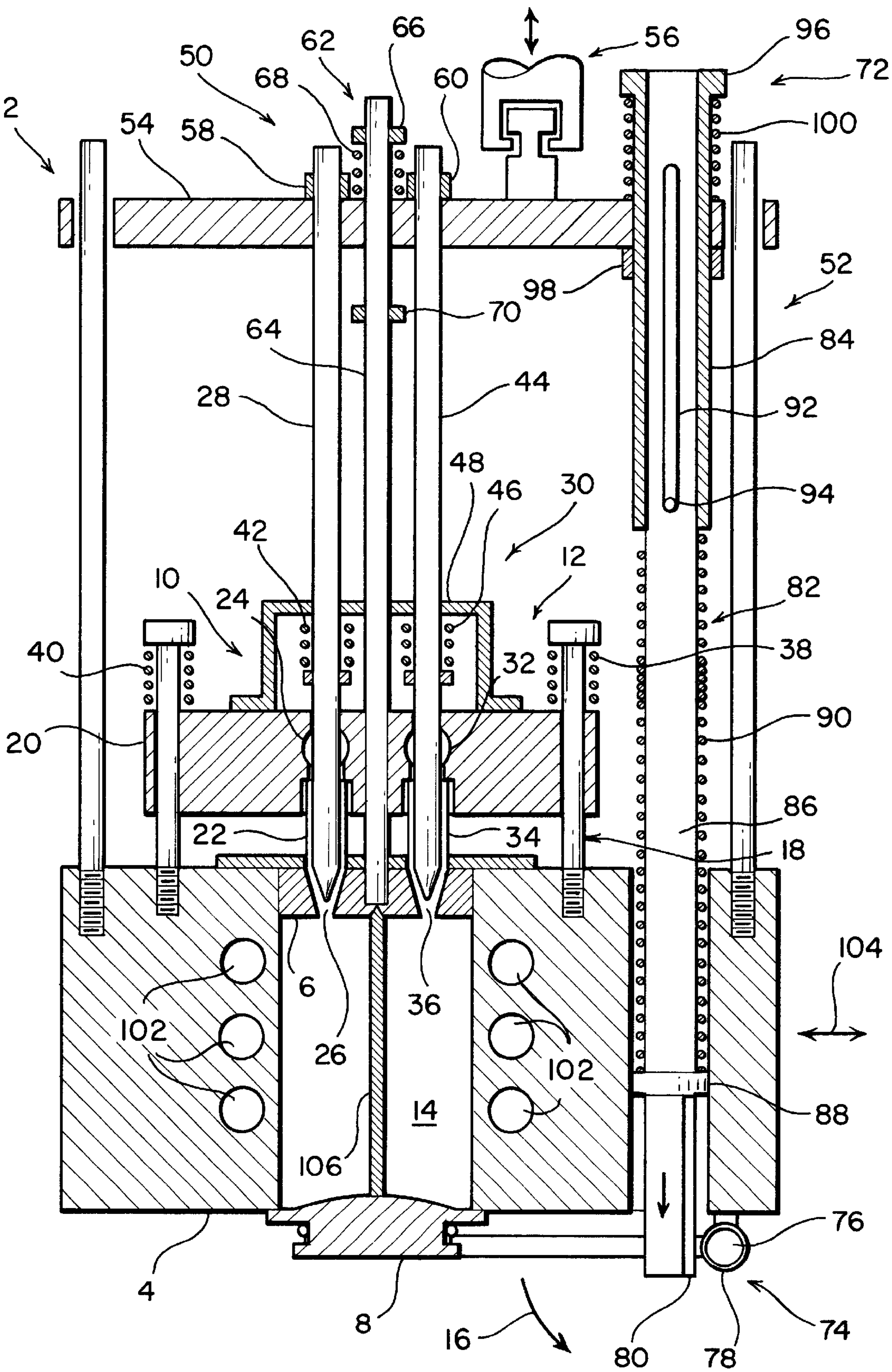
FIG. 1 illustrates certain features of a mold apparatus according to an embodiment of the invention.
Figure 2:
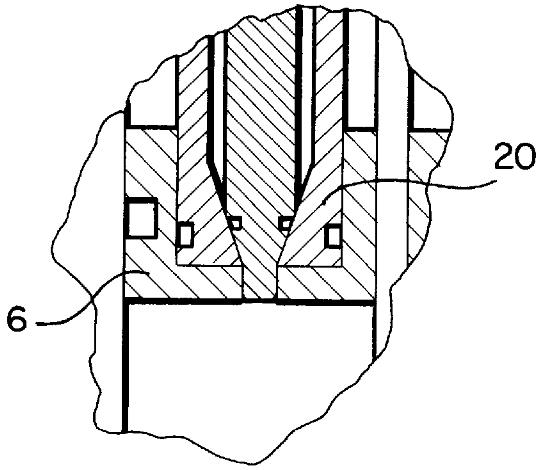
FIG. 2 is a detailed view of a portion of the apparatus shown in FIG. 1.
Figure 3:
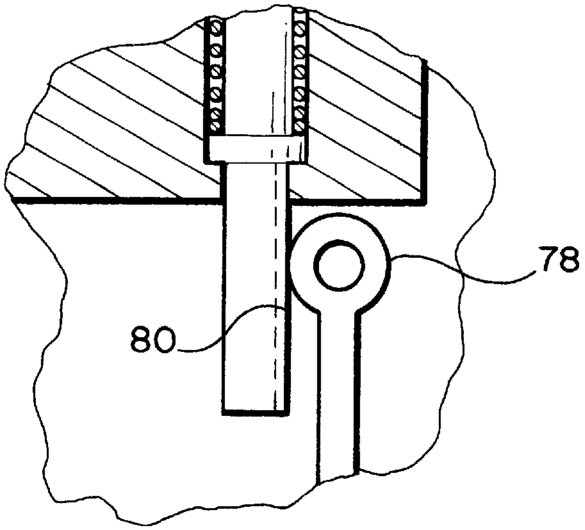
FIG. 3 is a detailed view of another portion of the apparatus shown in FIG. 1.

With reference to FIG. 1, an apparatus 2 comprises a block 4, a piston 6, a gate 8, a means 10 to inject the wax, and a means 12 to move the piston so that it follows the shrinkage of the wax as it solidifies. The block 4 defines a generally cylindrical mold chamber 14 for the candle blank. The mold chamber has a generally vertically positioned longitudinal axis, an upper end, and a lower end. The piston is positioned in the chamber to slide from the upper end to the lower end of the chamber. The gate is positioned at the lower end of the chamber. The gate is pivotally mounted to the block so as to move from a first position which seals the lower end of the chamber to a second position in which the gate does not impede the ejection of the candle blank from the chamber. See arrow 16. The means 10 injects hot liquid wax into the chamber between the gate and the piston The means 12 biases the piston toward the gate to reduce chamber volume as the hot liquid wax cools.

In the illustrated embodiment of the invention, the means 12 for biasing the piston comprises a first frame 18 extending upwardly from the block. Bolts are employed in the illustrated embodiment, but in a commercial setting, the mold would probably comprise a row of chambers formed in a bar of, say, aluminum, and the frame could be in the form of plates positioned on the end of the bar. A first crosspiece such as a header 20 is connected to the frame and extends over the upper end of the chamber. At least one pusher such as injection nozzle 22 is connected to the first crosspiece which is biased downwardly against the piston.

In the illustrated embodiment, the means 10 for injecting the hot liquid wax comprises the header 20. The header defines at least one liquid wax passage 24 which extends over the upper end of the chamber. The injection nozzle 20 has a downwardly extending flow passage which is in flow communication with the liquid wax passage in the header. An injection aperture 26 is defined through the piston. The injection aperture is in axial alignment with the flow passage through the injection nozzle. The means 12 urges the header down to contact the injection nozzle with the piston so that the flow passage though the injection nozzle is in flow communication with the aperture through the piston. When plunger 28 is lifted, a flow path can be established between the liquid wax passage in the header and the mold chamber defined between the piston and the gate. It will be understood that the liquid wax, at any desired temperature, say, 195 degrees F., can be continuously circulated in the passage 24.

To prevent vapor lock, the apparatus preferably further comprises a means 30 for exhausting fluids, generally gases, from the mold chamber defined between the piston and the gate. In the illustrated embodiment, at least one exhaust passage 32 is defined by the header which extends over the upper end of the chamber. An exhaust nozzle 34 having a downwardly extending flow passage is positioned in flow communication with the exhaust passage in the header. An exhaust aperture 36 is defined through the piston and is in axial alignment with the flow passage through the exhaust nozzle. The means 12 for urging the header down to establish a flow path between the liquid wax passage in the header and the mold chamber between the piston and the gate also causes the exhaust nozzle to contact the piston so that the flow passage though the exhaust nozzle is in flow communication with the exhaust aperture through the piston. The means 12 can be formed by a first spring 38 positioned between a first portion of the frame and the header and a second spring 40 positioned between a second portion of the frame and the header. The described structure forms a flow path between the exhaust passage in the header and the mold chamber between the piston and the gate. It will be understood that the exhaust passage can be maintained under a partial vacuum if desired.

The injection plunger 28 is partially positioned inside the injection nozzle 22 and has a face to seal against a plunger seat positioned in the injection nozzle. A biasing means including a spring 42 urges the injection plunger into sealing engagement with the plunger seat. An exhaust plunger 44 is partially positioned inside the exhaust nozzle 34 and has a face to seal against a plunger seat positioned in the exhaust nozzle. A biasing means including spring 46 urges the exhaust plunger into sealing engagement with the plunger seat.

The biasing means for the plungers in the illustrated embodiment includes a channel-shaped cap 48 which is positioned on top of the header. A flange is positioned on each of the plungers between the header and the cap. The spring is positioned around each plunger between the flange and the cap to urge each plunger downwardly toward the header and into sealing engagement with its respective seat. The plungers have a tail section which extends through the channel-shaped cap.

The invention further preferably includes a means 50 for lifting the plungers away from the seats. In the illustrated embodiment, this means is formed by a second frame 52 extending upwardly from the block. A second crosspiece 54 is connected to the second frame and extends over the upper end of the chamber. Where a plurality of chambers are employed in a row, the second cross piece can be in the form of a plate and the second frame and be plates extending between the mold body and the plate. An actuator means 56 is attached to the second crosspiece for selectively moving the crosspiece up or down to a predetermined position. A CNC milling machine is easily adapted to this purpose. Each plunger extends through the second crosspiece and has a flange 58, 60 positioned between the second cross piece and an upper end of the plunger. Movement of the cross piece upwardly by the actuator means engages the flanges and lifts the plungers from their respective seats.

When the plungers are lifted, it is desirable to provide a means 62 for biasing the piston 6 against the nozzles 22, 34 so as to maintain a seal between the nozzles and the piston. 11. In the illustrated embodiment, this is provided by a piston shaft 64 extending upwardly from the piston and through the second crosspiece 54. The piston shaft has an upper flange 66 positioned between the second cross piece and an upper end of the piston shaft. A spring 68 surrounds the piston shaft and contacts the upper flange and the second cross piece so as to urge the piston upwardly.

It is desirable in the invention to further provide a means for ejecting a finished candle blank from the mold. This could be done pneumatically or hydraulically if desired. In the illustrated embodiment, it is accomplished mechanically by a means for moving the piston to the bottom end of the chamber. The means includes a lower flange 70 positioned on the piston shaft between the second cross piece and an upper end of the block. The lower flange is positioned so that movement of the second cross piece downwardly by the actuator means engages the lower flange and pushes the piston to the lower end of the chamber.

It is desirable that the gate open wide no later than shortly after the piston begins moving downwardly. The illustrated embodiment schematically illustrates a means for moving the gate from the first position to the second position, including a means 72 for moving a rack gear 80. For the purposes of illustrating the invention, the means 72 is shown out of plane. In practice, it could be positioned on either or both ends of the mold block.

Preferably, the means for moving the gate comprises a means 74 for pivotally connecting the gate 8 to the block 4. The means 74 has a pivot pin 76. A pinion gear 78 is attached to the pivot pin. A rack gear 80 engages the pinion gear. The means 72 is for moving the rack gear from a first position to a second position. Movement of the rack gear from the first position to the second position moves the gate from the first position to the second position.

The means 72 includes a telescoping shaft 82 which extends from the second cross piece downwardly to the pinion gear. The telescoping shaft has an upper end attached to the second cross piece and a lower end which carries the rack gear. The telescoping shaft is in an extended configuration when the cross piece is in a raised position and the gate is in a closed position and in a collapsed configuration when the cross piece is in a lowered position and the gate is in an open position.

The telescoping shaft 82 has an upper portion 84 and a lower portion 86. The lower portion telescopes inside of the upper portion. The lower portion has a flange 88 positioned between the lower end of the upper portion and the lower end of the lower portion and a spring 90 is positioned between the lower end of the upper portion and the flange to bias the lower portion of the shaft toward the extended position. A longitudinally extending slot 92 is defined in the upper portion of the shaft. The slot has an upper end and a lower end. A pin 94 extends transversely through an upper portion of the lower shaft and is positioned in the slot. The pin abuts against the lower end of the slot when the telescoping shaft is in the extended position.

The upper portion of the telescoping shaft has an upper end positioned above the second cross piece and a flange 96 positioned near the upper end. A second flange 98 is positioned on the upper portion of the shaft between the second cross piece and the lower end of the upper portion of the shaft. A spring 100 is positioned between the cross piece and the flange positioned near the upper end to bias the upper portion of the telescoping shaft upwardly. The second flange limits upward movement of the upper portion of the telescoping shaft by contacting the second cross piece.

In the method of the invention, a volume of hot liquid candle wax is injected into a generally cylindrical chamber having a length and a diameter. The hot liquid candle wax is then cooled, to at least a semi-solid state. The wax shrinks as it cools. The length of the generally cylindrical chamber is reduced as the wax cools, so that the volume of the chamber remains substantially that of the volume of the shrinking wax.

The method can be carried out in the above described apparatus. The chamber can be defined by a generally cylindrical sidewall and have a first end and a second end. A gate can be provided at the second end of the chamber which is movable from a first position in which the gate is sealingly engaged with the second end of the chamber to a second position in which the gate does not impede the ejection of a candle blank from the chamber. A piston can be provided in the chamber which is movable from a first position which is near the first end of the chamber to a second position which is near the second end of the chamber. The gate and piston can be moved into their respective first positions. The chamber can be filled with molten wax. Molten wax at a temperature of 190 degrees F. has been tested with good results. The chamber can then be cooled to at least partially solidify the wax. The piston is moved toward its second positions as the wax partially solidifies to prevent voids from forming. Once the wax reaches a semi-solid state (the wax tested had a melting point of about 125 degrees F.) the gate can be moved into its second position. Once the gate has reached its second position, the piston can be moved into its second position to eject the candle blank from the chamber.

To speed cycle time, it is desirable to circulate a cooling fluid behind the generally cylindrical sidewall to cool the chamber and solidify the wax. Passages 102 in the block can be used for this purpose. Water is a desirable cooling fluid. For the tested materials, water at a temperature of about 110 degrees F. followed by water at a temperature of about 70 degrees F. was used with good results. Generally speaking, a cooling period ranging from 10 to 100 minutes is necessary. Water having a temperature of 110 degrees F. for 45 minutes followed by water having a temperature of 70 degrees F. for 15 minutes has been used with good results on 2 inch diameter candle blanks formed from wax having a 125 degree F. melting point. Wax is a good insulator, and larger candles may take disproportionately longer to adequately cool. After the candle blanks have been ejected, it is desirable to reheat the chamber by circulating a heating fluid behind the generally cylindrical sidewall. Passages 102 can be used for this purpose. Water at a temperature of 110 degrees F. has been used with good results.

For aesthetic purposes, it is desirable that the bottom end of the candle be formed in the top end of the mold. Where the ejected candle blank has an upper end and a lower end, and the upper end of the candle blank is formed adjacent to the gate. Any bubbles or voids which appear are thus likely to be on the bottom end of the candle, and not visible under ordinary conditions of use. The likelihood of blemishes can be reduced by circulating hot molten wax through the header prior to lifting the plunger, to purge the line of air bubbles, and by employing a vacuum on the exhaust line. The gate can be provided with a convex or concave surface on the inside of the mold, if desired, for greater aesthetics.

The invention is preferably carried out on a three-axis machine, such as a modified CNC milling machine. The table can move in the X and Y directions, and the head can move in the Z direction. A plurality of rows of mold chambers, each row having a cross section as shown in FIG. 1, can be positioned on the table. The chambers in each row are filled simultaneously by lifting their plungers. The table is then indexed as indicated by arrow to align another row under the head, and the chambers in that row are filled while the first row is cooled. A sufficient number of rows are preferably employed so that when the last row is being filled, the first row is ready to be emptied. It is expected, for example, that 12 rows each containing 12 chambers can be cycled every hour. A single operator should be able to manage 3 or 4 such machines. Cooling or heating fluid can be supplied by a timing device as needed. A row of chambers can be taken out of service if necessary with little disruption in the operation of the remaining rows of chambers.

FIG. 1 illustrates the invention where the chamber is being charged with hot wax. Once charging is complete, crosspiece 54 is lowered slightly to seat the plungers and cooling fluid is supplied through the passages 102. Piston 6 is urged down by nozzles 22 and 34 being acted on by springs 38 and 40 via the header 20. The piston follows the shrinking wax. After the wax has reached a semi-solid state, the crosspiece is moved further down, pushing down on telescoping shaft to open gate 8 and to push piston 6 down to the bottom end of the mold and eject the candle blank. If desired, the piston 6 can be fitted with a wick pin 106 to preform the wick hole and facilitate later placement and fixing of the wick.

While certain preferred embodiments of the invention have been described herein, the invention is not to be construed as being so limited, except to the extent that such limitations are found in the claims.

What is claimed is:

1. A process comprising providing a chamber defined by a generally cylindrical sidewall, said chamber having a first end and a second end, wherein the chamber has a longitudinal axis which is generally vertically positioned and the first end of the chamber constitutes an upper end and the second end of the chamber constitutes a lower end;

providing a gate at the second end of the chamber which is movable from a first position in which the gate is sealingly engaged with the second end of the chamber to a second position in which the gate does not impede the ejection of a candle blank from the chamber;

providing a piston in the chamber which is movable from a first position which is near the first end of the chamber to a second position which is near the second end of the chamber;

moving the gate into the first position;

moving the piston into the first position;

filling the chamber with hot molten candle wax;

cooling the chamber to at least partially solidify the wax, wherein the volume of wax shrinks as the wax cools;

moving the piston toward the second position as the wax partially solidifies thereby reducing the length of the generally cylindrical chamber as the wax cools, so that the volume of the chamber remains substantially the same as the volume of the shrinking wax, wherein the piston is moved toward the second position under urging from a biasing means;

moving the gate into the second position after the wax has reached a semi-solid state; and moving the piston to the second position to eject the candle blank from the chamber;

said process being carried out with a three-axis head, wherein the head moves in the +Z direction to open a valve and fill the chamber with molten wax, and then a predetermined amount in the −Z direction to load a spring which urges the piston against the solidifying wax, and then an additional predetermined amount in the −Z direction to engage a mechanism to move the gate into the second position, and then an additional amount in the −Z direction to move the piston into the second position and eject the candle blank.

2. A process as in claim 1 wherein the piston is biased toward the second position sufficiently to prevent voids from forming as the wax solidifies and shrinks.

3. A process as in claim 1 wherein the piston is biased toward the second position sufficiently to cause partially solidified wax to fill any voids which attempt to form as the wax solidifies and shrinks.

4. A process as in claim 1 further comprising circulating a cooling fluid behind the generally cylindrical sidewall to cool the chamber and solidify the wax.

5. A process as in claim 4 further comprising heating the chamber after the candle has been ejected by circulating a heating fluid behind the generally cylindrical sidewall.

6. A process as in claim 5 wherein the recited steps are conducted simultaneously for a plurality of chambers arranged in a row.

7. A process as in claim 5 wherein the ejected candle blank has an upper end and a lower end, and the upper end of the candle blank is formed adjacent to the gate.

8. A process as in claim 1 wherein the valve is formed by a valve seat in the piston and a plunger extending upwardly which seals against the valve seat, wherein movement of the head lifts the plunger upwardly away from the seat and permits molten wax to flow from a header into the chamber.

9. A process as in claim 8 further comprising circulating hot molten wax through the header prior to lifting the plunger upwardly.

10. A process as in claim 1 wherein movement of the head in the +Z direction further opens a second valve to permit gas and excess liquid to escape the chamber.

11. A process as in claim 1 wherein the three axis head is positioned above a first row of chambers positioned on a table, said process further moving the table to index the first row of chambers out from under the three axis head and position a second row of chambers under the three axis head.

12. Apparatus comprising a block which defines a generally cylindrical mold chamber for a candle blank, said generally cylindrical mold chamber having a generally vertically positioned longitudinal axis, an upper end, and a lower end;

a piston positioned in the chamber to slide from the upper end to the lower end of the chamber;

a gate positioned at a lower end of the chamber which is pivotally mounted to the block so as to move from a first position which seals the lower end of the mold chamber to a second position in which the gate does not impede the ejection of the candle blank from the chamber;

means for injecting hot liquid wax into the chamber between the gate and the piston; and means for biasing the piston toward the gate to reduce chamber volume as the hot liquid wax cools and prevent the production of a candle blank having a substantial void.

13. Apparatus as in claim 12 wherein the means for biasing the piston comprises a first frame extending upwardly from the block;

a first crosspiece connected to the frame and extending over the upper end of the chamber; and at least one pusher connected to the first crosspiece which is biased downwardly against the piston.

14. Apparatus as in claim 12 wherein the means for injecting the hot liquid wax comprises a header which defines at least one liquid wax passage extending over the upper end of the chamber;

an injection nozzle having a downwardly extending flow passage which is in flow communication with the liquid wax passage in the header;

an injection aperture defined through the piston which is in axial alignment with the flow passage through the injection nozzle, and means for urging the header down to contact the injection nozzle with the piston so that the flow passage though the injection nozzle is in flow communication with the aperture through the piston, thereby establishing a flow path between the liquid wax passage in the header and the mold chamber between the piston and the gate.

15. Apparatus as in claim 14 further comprising a means for exhausting fluids from the mold chamber defined between the piston and the gate wherein the means for exhausting fluids comprises at least one exhaust passage defined by the header which extends over the upper end of the chamber;

an exhaust nozzle having a downwardly extending flow passage which is in flow communication with the exhaust passage in the header; and an exhaust aperture defined through the piston which is in axial alignment with the flow passage through the exhaust nozzle, wherein the means for urging the header down to establish a flow path between the liquid wax passage in the header and the mold chamber between the piston and the gate also causes the exhaust nozzle to contact the piston so that the flow passage though the exhaust nozzle is in flow communication with the exhaust aperture through the piston, thereby establishing a flow path between the exhaust passage in the header and the mold chamber between the piston and the gate.

16. Apparatus as in claim 13 wherein the first crosspiece which extends over the upper end of the chamber is formed by a header which defines at least one liquid wax passage and at least one exhaust passage, and the at least one pusher connected to the crosspiece which is biased downwardly against the piston is formed by an injection nozzle having a downwardly extending flow passage which is in flow communication with the liquid wax passage in the header; and an exhaust nozzle having a downwardly extending flow passage which is in flow communication with the exhaust passage in the header;

and the header is biased downwardly by a first spring positioned between a first portion of the frame and the header and a second spring positioned between a second portion of the frame and the header.

17. Apparatus as in claim 16 further comprising a plunger seat positioned in the injection nozzle;

an injection plunger positioned in the injection nozzle which has a face to seal against the plunger seat, a biasing means to urge the injection plunger into sealing engagement with the plunger seat, a plunger seat positioned in the exhaust nozzle, an exhaust plunger positioned in the exhaust nozzle which has a face to seal against the plunger seat;

a biasing means to urge the second plunger into sealing engagement with the plunger seat.

18. Apparatus as in claim 17 wherein the biasing means to urge the plungers into sealing engagements with the plunger seats comprises a channel-shaped cap positioned on top of the header, a flange positioned on each of the plungers between the header and the cap, and a spring positioned around each plunger between the flange and the cap, to urge each plunger downwardly toward the header and into sealing engagement with its respective seat;

wherein the plungers extend through the channel-shaped cap.

19. Apparatus as in claim 18 further comprising a means for lifting the plungers away from the seats.

20. Apparatus as in claim 19 wherein the means for lifting the plungers comprises a second frame extending upwardly from the block;

a second cross-piece connected to the second frame and extending over the upper end of the chamber; and an actuator means attached to the second cross-piece for selectively moving the cross-piece up or down to a predetermined position;

wherein each plunger extends through the second cross-piece and has a flange positioned between the second cross piece and an upper end of the plunger, so that movement of the cross piece upwardly by the actuator means engages the flanges and lifts the plungers from their respective seats.

21. Apparatus as in claim 18 further comprising a means for biasing the piston against the nozzles so as to maintain a seal between the nozzles and the piston.

22. Apparatus as in claim 21 wherein the means for biasing the piston against the nozzles comprises a second frame extending upwardly from the block;

a second crosspiece connected to the second frame and extending over the upper end of the chamber; and an actuator mans attached to the second crosspiece for selectively moving the crosspiece up or down to a predetermined position;

a piston shaft extending upwardly from the piston and through the second crosspiece, said piston shaft having an upper flange positioned between the second cross piece and an upper end of the piston shaft; and a spring surrounding the piston shaft and contacting the upper flange and the second cross piece so as to urge the piston upwardly.

23. Apparatus as in claim 19 further comprising the means for biasing the piston against the nozzles when the plungers are lifted from their seats, so as to maintain a seal between the piston and the nozzles, said means comprising a second frame extending upwardly from the block;

a second crosspiece connected to the second frame and extending over the upper end of the chamber; and an actuator means attached to the second crosspiece for selectively moving the crosspiece up or down to a predetermined position;

a piston shaft extending upwardly from the piston and through the second crosspiece, said piston shaft having an upper flange positioned between the second cross piece and an upper end of the piston shaft; and a spring surrounding the piston shaft and contacting the upper flange and the second cross piece so as to urge the piston upwardly when the plungers are raised from their seats.

24. Apparatus as in claim 21 further comprising a means for moving the piston to the bottom end of the chamber to eject a candle blank.

25. Apparatus as in claim 24 wherein said means comprises a second frame extending upwardly from the block;

a second crosspiece connected to the second frame and extending over the upper end of the chamber; and an actuator means attached to the second crosspiece for selectively moving the crosspiece up or down to a predetermined position;

a piston shaft extending upwardly from the piston and through the second crosspiece, said piston shaft having a lower flange positioned between the second cross piece and an upper end of the block; and said lower flange being positioned so that movement of the second cross piece downwardly by the actuator mans engages the lower flange and pushes the piston to the lower end of the chamber.

26. Apparatus as in claim 24 further comprising a means for moving the gate from the first position to the second position.

27. Apparatus as in claim 26 wherein the means for moving the gate comprises means for pivotally connecting the gate to the block, said means having a pivot pin, a pinion gear attached to the pivot pin, a rack gear engaging the pinion gear, and means for moving the rack gear from a first position to a second position, wherein movement of the rack gear from the first position to the second position moves the gate from the first position to the second position.

28. Apparatus as in claim 27 wherein the means for moving the rack gear comprises a second frame extending upwardly from the block;

a second crosspiece connected to the second frame;

an actuator means attached to the second crosspiece for selectively moving the crosspiece up or down to a predetermined position;

a telescoping shaft extending from the second cross piece downwardly to the pinion gear, said telescoping shaft having an upper end attached to the second cross piece and a lower end which carries the rack gear, said telescoping shaft being in an extended configuration when the cross piece is in a raised position and the gate is in a closed position and in a collapsed configuration when the cross piece is in a lowered position and the gate is in an open position.

29. Apparatus as in claim 28 wherein the telescoping shaft has an upper portion and a lower portion and the lower portion telescopes inside of the upper portion, wherein the lower portion has a flange positioned between the lower end of the upper portion and the lower end of the lower portion and a spring is positioned between the lower end of the upper portion and the flange to bias the lower portion of the shaft toward the extended position; wherein a longitudinally extending slot is defined in the upper portion of the shaft, said slot having an upper end and a lower end, and a pin extending transversely through an upper portion of the lower shaft is positioned in the slot, wherein the pin abuts against the lower end of the slot when the telescoping shaft is in the extended position.

30. Apparatus as in claim 29 wherein the upper portion of the telescoping shaft has an upper end positioned above the second cross piece and a flange positioned near the upper end, and a second flange is positioned on the upper portion of the shaft between the second cross piece and the lower end of the upper portion of the shaft, wherein a spring is positioned between the cross piece and the flange positioned near the upper end to bias the upper portion of the telescoping shaft upwardly, wherein the second flange limits upward movement of the upper portion of the telescoping shaft by contacting the second cross piece.

* * * * *